UNITED STATES PATENT OFFICE.

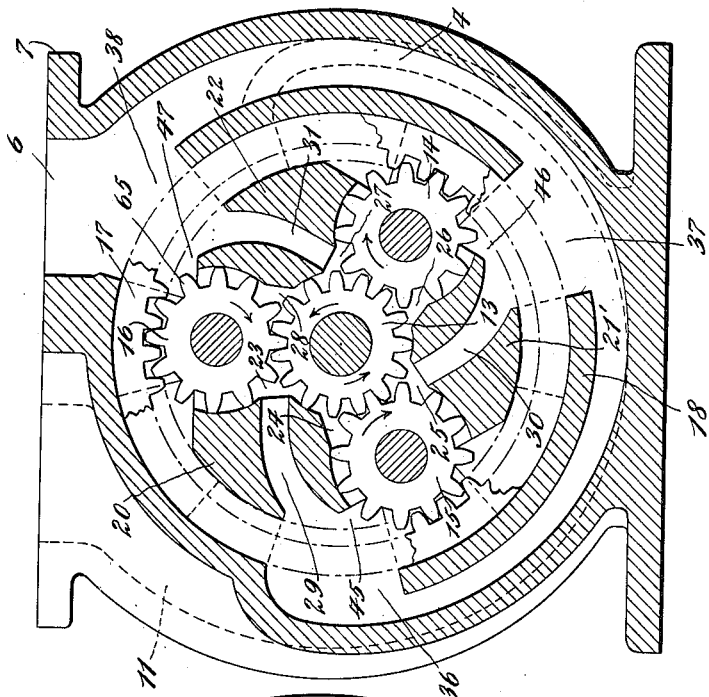

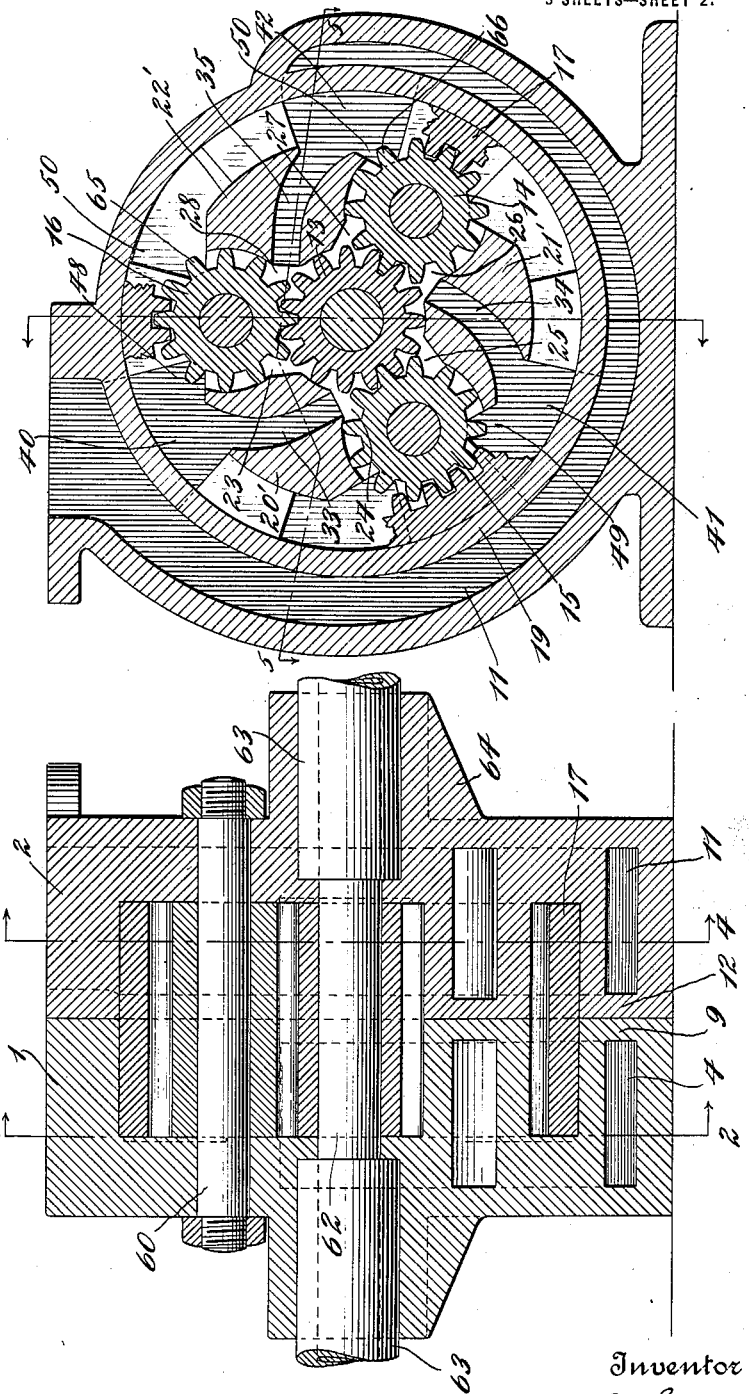

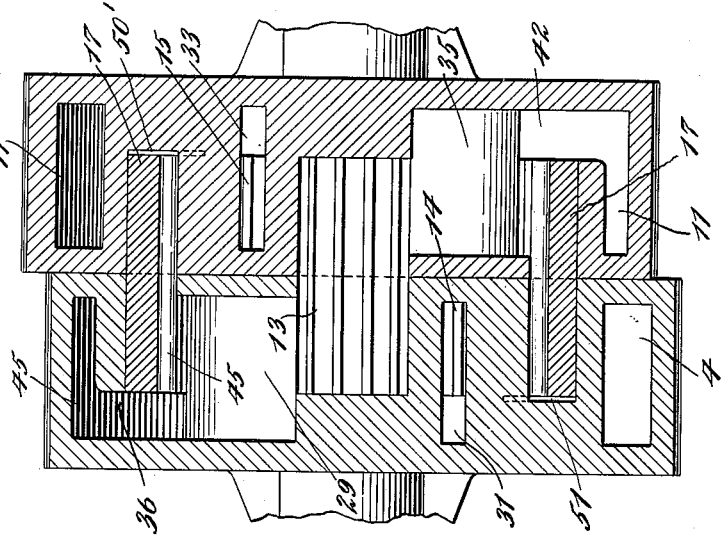

WILLIAM E. SHORE, OF NEW YORK, N. Y., ASSIGNOR TO THE FRANEY-SHORE CO., A CORPORATION OF DELAWARE.

GEAR-PUMP.

1,287,118.

Specification of Letters Patent.  Patented Dec. 10, 1918.

Application filed December 6, 1915.   Serial No. 65,167.

*To all whom it may concern:*

Be it known that I, WILLIAM E. SHORE, a subject of the King of Great Britain, residing at the city of New York, in the borough of Richmond and State of New York, have invented certain new and useful Improvements in Gear-Pumps, of which the following is a full, clear, and exact description.

This invention relates to gear pumps, and more particularly to a pump which is suitable for pumping water or other fluids. The primary object of the invention is to provide a pump of this character in which the liquid forces acting upon the rotating parts are balanced by the inflowing and outflowing fluid pressures, so that the power required to drive the rotating member remains constant for a full revolution of the member, which will permit the pump to be directly connected to an electric or other prime mover having a constant torque.

Another object of the invention is to eliminate all radial and lateral thrust upon the rotating parts or their shafts so that these parts practically work freely within the casing without material friction, and excessive wear upon the bearings is eliminated.

Still another object of the invention is to provide a casing having a plurality of inlet conduits therein and in which the flow is substantially equal and a plurality of discharge conduits of a like character.

A further object of the invention is to provide means for preventing excessive wear upon the gear teeth due to the grinding or erosive action of gritty water or other fluids under high pressures and velocities.

Further objects of the invention are to make the casing and rotating parts of simple and durable constructions permitting the pumps to be made of any desired size, depending upon the volume required.

With these and other objects in view the invention consists of a casing inclosing a central and a plurality of radial gears spaced equi-distant therearound together with a plurality of inlet and discharge conduits in said casing so arranged that the action of the fluid is always distributed equally upon the central gear which is the driving member. This balancing of the forces on the central gear is obtained by arranging the inlet ports and also the outlet ports so that the ports of each set are spaced equi-distant around the central gear, and the fluid entering and leaving the ports flows in a direction substantially tangentially to the central gear at its points of rolling contact with the radial gears.

The invention also consists of an annular gear which surrounds and meshes with the radial gears. Inlet ports and outlet ports are also provided for admitting and discharging the fluid carried along the inner face of this gear, which ports are also spaced equi-distant around the annular gear so that the pressure upon the gear created by the admission of the fluid to the chamber at a plurality of points, balance each other, and in the same manner the pressure upon the gear created by the discharge of the fluid at a plurality of points also balance each other. By this balancing the annular gear absolutely floats within the casing.

To prevent eddy currents and to insure an equal flow of the fluid through the inlet and discharge conduits, volute chambers are preferably formed in the casing at the periphery. Two such chambers are utilized, one an inlet chamber, and the other an outlet chamber, and the inlet and outlet conduits communicate with these chambers.

To prevent any lateral thrust upon the gears due to the exposing of one end face of a gear to the pressure of the fluid, a depression is formed in the casing adjacent the opposite end face of the gear, which depression is of a size and shape equal to the size and shape of the portion of the face of the gear which is exposed to the action of the fluid. The fluid passing along the face of the gear enters this depression and thus serves to protect the gear against the lateral pressure.

The invention also consists of a set of auxiliary gears which are mounted upon the shaft of the central gear exteriorly of the casing at both ends. These gears are of the same size as the central and radial gears within the casing, and will maintain the gears within the casing in correct position after they have commenced to wear, and thus insure against excessive wear of the inner gear which would otherwise result in a leakage of the fluid through the gear.

The invention also consists of the constructions and combinations which will be hereinafter described, and particularly set forth in the appended claims. In the accompanying drawings I have illustrated a pump constructed in accordance with the principles of my invention, and Figure 1 is an end elevation of such a pump;

Fig. 2 is a section taken substantially on the line 2—2 shown in Fig. 3 looking in the direction of the arrows;

Fig. 3 is a central vertical section through the pump;

Fig. 4 is a vertical section taken on the line 4—4 of Fig. 3;

Fig. 5 is a horizontal section taken on the lines 5—5 shown in Fig. 4, and

Fig. 6 is a central vertical section similar to Fig. 3, but showing auxiliary gears.

The pump as is the usual construction, comprises a casing, which in the present instance is formed in two sections 1 and 2. Each section is of the same construction, one of which may be regarded as the intake section and the other as the discharge section, it being immaterial which sections are so designated, as the flow of the fluid through the pump depends upon the direction of the rotation of the gears. In the following description section 1 is however to be regarded as the inlet section, and section 2 as the discharge section. The section 1 is substantially cylindrical in shape and adjacent its periphery there is formed therein a volute chamber 4 which extends about three-quarters away around the casing. This chamber is open at one end as at 6, where the casing is provided with a flange 7 surrounding the opening 6, providing means for coupling a pipe to the pump for admission of the fluid. As will be clear from Figs. 3 and 5 this volute chamber is formed entirely within the section 1, and has a side wall 9 which forms a part of the face of the section which abuts against the section 2. The outlet section 2 is provided with a similarly formed volute chamber 11, which is also formed entirely within the section and has a side wall 12. Arranged within suitable chambers within the casing are a plurality of gears consisting of a central gear 13, and a plurality of radial gears 14, 15 and 16. Three such gears are shown which are spaced 120° apart, although if desirable, a greater number of radial gears may be used, but in each instance they should be spaced equidistant around the central gear. As will be clear from Figs. 3 and 5, the chambers formed in the casing for housing the gears are formed partially in the section 1 and partially in the section 2, and the chambers in the two sections are in open communication with each other. Meshing with the radial gears and disposed in a suitable annular chamber formed in sections 1 and 2 is an annular gear 17 which is of the same width as the gear wheels. The annular chamber in which this annular gear is mounted is separated from the inlet and discharge chambers by walls 18 and 19 respectively. The annular chamber and the cylindrical gear chambers in the casing sections 1 and 2 are so formed as to permit the various gears to mesh with each other and therefore provide what may be regarded as a single chamber having a plurality of irregular shaped blocks or pieces in each of the sections. These pieces or blocks are all of the same shape and size and the blocks in the inlet section have been designated 20, 21 and 22, and those in the outlet section 20', 21' and 22'. The blocks are necessarily spaced 120° apart, due to the spacing of the radial gears and since they are of the same shape and size the blocks in the respective sections will aline when the sections are both bolted together. The corners of each of these blocks are cut off which will provide substantially triangular-shaped passages on each side of a point of contact of the central gear with one of the radial gears; or in other words, six triangular spaced passages are provided which extend across the face of the central gear. In the drawings these passages are designated 23, 24, 25, 26, 27 and 28, and as will be clear from Figs. 2 and 4 they are spaced 60° apart. Formed in the blocks 20, 21 and 22 of the inlet sections are conduits 29, 30 and 31 respectively, which lead to the passages 23, 25 and 27, while formed in the blocks 20', 21' and 22' of the outlet sections are conduits 33, 34 and 35 which lead to the passages 24, 26 and 28, respectively; or in other words, the conduits of the inlet and outlet sections respectively, lead to passages spaced 120° apart around the central gear. The conduits 29, 30 and 31 of the inlet section communicate with the volute inlet chamber 4 through conduits 36, 37 and 38, which are of much greater cross sectional area than the respective conduits to which they are connected. These conduits are cut partially in the wall 17 which separates the volute chamber 4 from the annular chamber and partially in the casing wall, and as will be clear from Figs. 3 and 5, extend outwardly beyond the gear chambers being of the same width as the volute chamber and conduits 29, 30 and 31 to which they are connected. The conduits 36, 37 and 38 therefore permit the fluid to pass around the end of the annular gear and enter the conduits 29, 30 and 31. The conduits 33, 34 and 35 of the outlet section in the same manner communicate with conduits 40, 41 and 42 which are similar in construction to the conduits 36, 37 and 38 formed in the inlet section 1. Conduits 36, 37 and 38 due to their shape also leave a passage for the fluid at three points spaced 120° apart around the annular gear, which points are designated 45, 46 and 47, and in the same manner the conduits 40, 41 and 42 provide passages which are designated 48, 49 and 50.

The operation of the pump will now be described. Assuming that the fluid enters the pump through the opening 6 of the inlet volute chamber 4, the fluid will enter the conduit 38 and will pass around the annular gear into conduit 31 into the passage 27 and in the same manner the fluid will pass down through the volute chamber 4 through conduits 37 and 30 to the passage 25 and also through conduits 36 and 29 to passage 23. The fluid admitted around the central gear is therefore spaced equi-distant around the central gear and will therefore create no radial thrust upon the gear. If the gears are rotating in the direction of the arrows in Fig. 2, the fluid entering the passage 27 will be carried by the gear teeth of the central gear to passage 28, the fluid filling the space between the teeth of the central gear so that when the central gear has rotated one-sixth of a revolution, the fluid originally admitted through passage 27 will enter the passage 28 and be forced into conduits 35 and 42, to the volute chamber 11 of the outlet section of the pump. It may here be noted that at the points where the teeth of the central gear are in contact with the teeth of the radial gear, a liquid seal is formed which will prevent any leakage of the fluid backward through the teeth, as for example, from passage 27 to passage 26. The fluid entering through the conduits 38 and 31 will also pass into the passage 47 around the end face of the annular gear and across the face of the gear teeth and will fill the spaces between the gear teeth. Since the walls of the parts 22 and 22' will prevent the back flow of the liquid upon further rotation of the gear the fluid will be forced into the passage 50 and be discharged through conduit 42 into the volute chamber 11. A liquid seal is also formed by the teeth of the radial gear in mesh with the teeth of the annular gear which will prevent any back leakage of the fluid at this point.

In the same manner the fluid which enters the teeth of the annular ring through the passage 46 will be carried by the annular ring to the passage 49 at which point it will be discharged through the conduit 41 and into volute chamber 11, and the water which enters the passage 45 will be carried through conduit 40 into the outlet chamber 11 in the same manner as previously described. It will, therefore, be seen that the pressure of the water admitted to the annular ring is exerted against the inner face thereof at three points spaced equi-distant around this surface, and therefore, will create no radial thrusts upon the ring tending to cause it to bear against the wall 17 of the chamber. Likewise the fluid is discharged through passages 48, 49 and 50, exerting a pressure upon the inner face of the ring which balance each other, since these passages are spaced equi-distant around the ring. In other words, the ring will practically float freely within the casing.

The water or fluid entering the passage 27 will also be carried by the teeth of the radial gear 14 to the passage 50 at which point it will be discharged through conduit 42 and volute chamber 11, and in the same manner the fluid entering passage 25 will be carried to discharge passage 49 and the fluid entering passage 23 to discharge passage 48. The pressure of the fluid against this gear is also substantially balanced since the pressure of the water in the passage 47 is balanced by the pressure in the passage 23, and the pressure in the discharge passage 28 is balanced by the pressure in the discharge passage 48.

Referring now to Fig. 3, the radial gears are mounted upon stationary bolts or spindles 60 which serve to connect the sections of the casing.

The central gear is mounted upon a rotating shaft 62 which passes through stuffing boxes 63 carried by bosses 64 projecting from the end walls of the casing. The rotating shaft may be extended in either direction and is adapted to be directly connected with an electric motor or other prime mover. The mounting of the radial gears upon the bolts which unite the casing sections is also of value for the reason that it reduces the number of parts and forms a rigid connection between the casing sections.

Referring now to Fig. 5, it will be seen that since the conduits 36, 37 and 38 extend out beyond the annular gear and the fluid passes around the annular gear into the passages 47, etc., portions of the end faces of the annular gear are subjected to the pressure of the fluid within these conduits, which pressure would have a tendency to cause a lateral thrust upon the annular gear. In the same manner the other end face of the annular gear is exposed to the pressure of the fluid in the discharge conduits 40, 41 and 42, which pressure is greater than the pressure in the corresponding inlet conduits, and the annular gear due to this inequality of pressure would be normally forced to the left as viewed in Fig. 5, causing one end face of the annular gear to bear upon the casing wall resulting in excessive friction and wear upon the gear. To compensate for this lateral thrust upon the annular gear, segmental-shaped depressions corresponding in shape and size to the portions of the annular gear which are exposed to the pressure of the fluid are formed opposite the casing wall, as for example, (see Fig. 5), a portion of the annular gear is exposed in conduit 36 and a depression 50' is formed in the casing wall at a point directly opposite the exposed portion. In the same manner a depression 51 is formed opposite the portion of the annular gear exposed in conduit 42. The fluid which fills the spaces between the teeth of the annular gear enters these depressions and equalizes the lateral pressure which would otherwise occur on the annular gear at these points. It is to be understood that opposite each exposed portion of the annular gear similar depressions are formed, and the result will be a ring which is balanced against lateral pressure.

It will also be seen that one of the teeth of each of the radial gears is similarly exposed to the pressure of the fluid, as for example, the tooth 65 of the gear wheel 16 which is exposed to the pressure in the conduit 38 and the tooth 66 of the radial gear 14 which is exposed to the pressure in the discharge conduit 42.

The depressions 50′ and 51 previously described are therefore formed of a size to provide a depression at the opposite end face of these teeth, so that any slight lateral pressure upon the radial gears is eliminated.

It will therefore be seen that in the construction described all of the rotating parts are perfectly balanced against all lateral and radial thrust, which permits the rotating parts to be driven at relatively high speed, and a large volume of water at a high velocity obtained. It will also be seen that from the above description the water or fluid is carried simultaneously by nine different parts of the system of gears which will insure that a large volume of water will be pumped by a pump of relatively small dimensions.

The form of pump shown in Fig. 6 is in general similar to the pump previously described, the casing sections and pump gears being similar, however, to prevent excessive wear upon the teeth of the pump gears, which would occur if the pump is used for pumping gritty fluids, and for obtaining a head of water of extremely high velocity and volume. This excessive wear occurs upon the faces of the teeth of the gears as they come into sliding contact, where one gear drives another, for it is obvious that if the fluid contains grit the surface of the teeth in contact will cause a grinding action of one tooth upon the other and if some means is not employed to compensate for this wear the teeth will rapidly wear down. In the construction shown in Fig. 6 there is mounted upon the rotating shaft 70 two gears 71 which are disposed exteriorly of the casing at each end thereof. These gears are of the same diameter and pitch as the central pump gear 13. The radial pump gears 14, 15, and 16 are provided with sleeves 72 which may be integral therewith and which rotate upon the stationary bolts or spindles 73 which serve to connect the casing as before described. Mounted upon the sleeve 72 exteriorly of the casing and in mesh with the exterior gears 71, are duplicate radial gears 74. Surrounding each set of exterior gears, is an oil tight casing 75 which is filled with oil. The bolts or spindles 73 which connect the casing together extend through the auxiliary casings and thus serve to hold all of the casing sections together. It will be seen by the construction described that since the exterior gears run in an oil bath there is practically no wear upon the teeth, and it will also be seen that since the radial and central gears of the exterior sets of gears are rigidly mounted for rotation with the pump gears their angular positions with respect to the corresponding pump gears does not vary. Therefore, after the teeth of the pump gears wear slightly they will no longer engage each other since the teeth of the exterior gear have not been worn the same amount which determines the angular position of the teeth of the pump gears. In other words the teeth of the pump gears will always be spaced a slight distance from each other which will prevent any further wear of the teeth.

While in the form shown in Fig. 6 it is intended to drive the pump through the central shaft, yet it is apparent that by placing an annular ring around one or both sets of the exterior gears, the annular ring may be utilized as the driving member and the pump operated at a slower speed, but with greater power.

The gear pump described is reversible, by which is meant that instead of utilizing the same as a pump it may be utilized as the power transmitting device. If a fluid under pressure should be passed through the pump the action of the parts will be the same as previously described except that the pressure of the liquid passing through the pump will cause a rotation of the gears and the central shaft which can then be utilized to transmit power in the usual manner. The pump when put to this use is adapted to form a part of a system of hydraulic power transmission for vehicles, vessels, and machinery, or for like purposes.

I claim:

1. In a gear pump, a casing, a central gear, three or more radial gears spaced equidistantly around said central gear and rotating on fixed axes, an internal annular gear meshing with said radial gears, inlet and discharge conduits in said casing respectively arranged to direct the flow of the fluid in a direction substantially tangential to the gears at their points of contact, and at points spaced equi-distantly around the central gear in said annular gear.

2. In a gear pump, a casing, a central gear, three or more radial gears rotating on fixed axes spaced equi-distantly around said central gear and meshing therewith, a revoluble internal annular gear meshing with said radial gears, said casing having chambers formed therein of a size to receive each of said gears, inlet and discharge conduits in said casing leading to said chambers and respectively arranged to direct the flow of the fluid toward and away from said gears at points spaced equi-distantly around said central gear and said internal gear.

3. In a gear pump, a casing, a central gear, three or more radial gears spaced equidistant around said central gear and rotating on fixed axes, a revoluble internal gear meshing with said radial gears, inlet and discharge conduits in said casing each of said conduits having a port communicating with the space formed adjacent the central gear and a radial gear at their point of rolling contact and having another port communicating with the space formed adjacent one of the radial gears and the annular gear at their point of rolling contact.

4. In a gear pump, a casing, a central gear, three or more radial gears spaced equidistant around said central gear and rotating on fixed axes, a revoluble internal gear meshing with said radial gears, said casing having a plurality of fluid passages communicating with said central and internal gears at points spaced equidistant around said central and internal gears.

5. In a gear pump, a casing, a central gear, three or more radial gears spaced equidistant around said central gear rotating on fixed axes, a revoluble internal gear meshing with said radial gears, said casing having a plurality of fluid inlet passages in communication with the face of said central gear and internal gear at points spaced equidistantly therearound, and a plurality of discharge passages in communication with said central gear and internal gear at points spaced equidistantly therearound.

6. In a gear pump, a casing, a central gear, three or more radial gears spaced equidistant around said central gear and rotating on fixed axes, a revoluble internal gear meshing with said radial gears said casing having a plurality of fluid inlet passages in communication with the central gear and the internal gear at points spaced equidistantly therearound, said casing having a plurality of fluid discharge passages communicating with said central gear and internal gear at points spaced equidistantly therearound, said passages being of a size to restrict the communication between them and the face of the gears to a portion of the width of the gears, whereby said inlet and discharge passages are only in communication across the face of said gears.

7. In a gear pump, a casing, a central gear, three or more radial gears spaced equi-distant around said central gear and rotating on fixed axes, a revoluble internal gear meshing with said radial gears said casing having a plurality of fluid inlet passages leading to the face of each of said gears, and a plurality of fluid discharge passages leading from the face of each of said gears.

8. In a gear pump, a casing, a central gear, three or more radial gears spaced equi-distant around said central gear and rotating on fixed axes, a revoluble internal gear meshing with said radial gears said casing having a plurality of fluid inlet passages leading to the face of each of said gears, and a plurality of fluid discharge passages leading from the face of each of said gears, the passages communicating with the face of each gear being disposed at substantially equal distances around said gear to balance the thrust thereon.

9. In a gear pump, a casing, a central gear, a plurality of radial gears spaced equidistantly around said central gear and in mesh therewith, an annular gear surrounding said radial gears and meshing therewith, a closed chamber in said casing inclosing said gears, inlet and discharge chambers formed in said casing, inlet conduits leading from said inlet chamber to the gear chamber at points disposed equi-distantly around said central and annular gears, and discharge conduits leading from discharge chamber to said gear chamber at points disposed equi-distantly around said central and annular gears, said inlet and discharge conduits communicating with each other only across the face of said gears and being out of direct communication with each other.

10. In a gear pump, a casing, a central gear, a plurality of radial gears spaced equidistantly therearound, an annular gear surrounding said radial gears, and meshing therewith, a closed gear chamber in said casing surrounding said gears, inlet and discharge chambers formed in said casing, a plurality of inlet conduits leading from said inlet chamber to said gear chamber and disposed adjacent one end of the set of gears at points disposed equi-distantly around the central and annular gears, similarly arranged discharged conduits disposed adjacent the opposite ends of the set of gears, said inlet and discharge conduits communicating with each other only across the face of the gears and being out of direct communication with each other.

11. In a gear pump, a casing having a chamber therein, a gear in said casing, a conduit in said casing leading to said chamber, said gear having a portion of one end face thereof exposed to the pressure of the fluid in said conduit, a depression in the wall of said chamber adjacent the opposite end face of said gear, said depression being of the same size and shape as the exposed portion of the gear whereby the fluid which enters said depression will balance said gear against lateral thrust.

12. In a gear pump, a casing having a chamber therein, a gear in said casing, a conduit in said casing leading to said chamber, said gear having a portion of one end face thereof exposed to the pressure of the fluid in said conduit, and having its other end face abutting the opposite end wall of said chamber, a depression formed in said wall of the same shape and size as the exposed portion of said gear, said chamber closely surrounding said gear whereby the space between the teeth of said gear form passages permitting the fluid to enter said depression and balance said gear against lateral thrust.

13. In a gear pump, a casing, a closed chamber formed therein, central gear, radial gears and an annular gear surrounding said radial gears, mounted in said chamber, inlet and discharge conduits leading to said chamber, said conduits exposing a portion of said annular gear to the pressure of the fluid within said conduits, a depression formed in the walls of said chamber opposite each exposed portion of the annular gear of the same size and shape as the portion of the gear exposed.

14. In a gear pump, a casing, a central gear, a plurality of radial gears spaced equidistantly therearound, an annular gear surrounding said radial gears, and meshing therewith, a closed gear chamber in said casing surrounding said gears, inlet and discharge volute chambers formed in said casing, a plurality of inlet conduits leading from said inlet chamber to said gear chamber and disposed adjacent one end of the set of gears at points disposed equi-distantly around the central and annular gears, similarly arranged discharge conduits disposed adjacent the opposite ends of the set of gears, said inlet and discharge conduits communicating with each other only across the face of the gears and being out of direct communication with each other.

In witness whereof I subscribe my signature, in the presence of two witnesses.

WILLIAM E. SHORE.

Witnesses:
   WALDO M. CHAPIN,
   MARY G. HART.